US006663408B2

(12) United States Patent
Sato

(10) Patent No.: US 6,663,408 B2
(45) Date of Patent: Dec. 16, 2003

(54) CARD CONNECTOR

(75) Inventor: Shigeru Sato, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/067,413

(22) Filed: Feb. 7, 2002

(65) Prior Publication Data

US 2002/0119691 A1 Aug. 29, 2002

(30) Foreign Application Priority Data

Feb. 8, 2001 (JP) ........................................ 2001-032753
Feb. 8, 2001 (JP) ........................................ 2001-032754

(51) Int. Cl.⁷ .............................................. H01R 13/62
(52) U.S. Cl. ...................................... 439/331; 439/631
(58) Field of Search ................................ 439/326, 331, 439/630, 631; 235/486

(56) References Cited

U.S. PATENT DOCUMENTS

| | | | | |
|---|---|---|---|---|
| 3,771,109 A | * | 11/1973 | Bruckner et al. ............ | 439/331 |
| 5,741,150 A | | 4/1998 | Stinson et al. .............. | 439/157 |
| 5,986,891 A | * | 11/1999 | Sugimoto ................... | 439/331 |
| 6,106,317 A | * | 8/2000 | Michaelis et al. .......... | 439/331 |
| 6,231,365 B1 | * | 5/2001 | Konno et al. ............... | 439/331 |
| 6,273,739 B1 | * | 8/2001 | Konno et al. ............... | 439/331 |

FOREIGN PATENT DOCUMENTS

| | | |
|---|---|---|
| JP | 4-149974 | 5/1992 |
| JP | 5-97066 | 12/1993 |
| JP | 9-48451 | 2/1997 |
| JP | 9-82429 | 3/1997 |
| JP | 9-185973 | 7/1997 |
| JP | 9-298074 | 11/1997 |
| JP | 2000-340280 | 12/2000 |
| JP | 2000-340298 | 12/2000 |

* cited by examiner

Primary Examiner—P. Austin Bradley
Assistant Examiner—Briggitte R. Hammond
(74) Attorney, Agent, or Firm—Finnegan, Henderson, Farabow, Garrett & Dunner, LLP

(57) ABSTRACT

A card connector for an IC card has a connector body, a card slot formed in the connector body, a cover for covering the card slot, and locking portions disposed in the connector body. The cover is pivotally supported at a first edge portion thereof by a pivotal pin which is supported by the connector body. The cover has a hook at a second edge portion opposite to the first edge portion. The cover can be moved with respect to the connector body along the pivotal pin. When the cover is moved along the pivotal pin in a closed state, the locking portion comes to engage with the hook of the cover, thereby restricting a pivotal movement of the cover for exposing the card slot or the card.

12 Claims, 17 Drawing Sheets

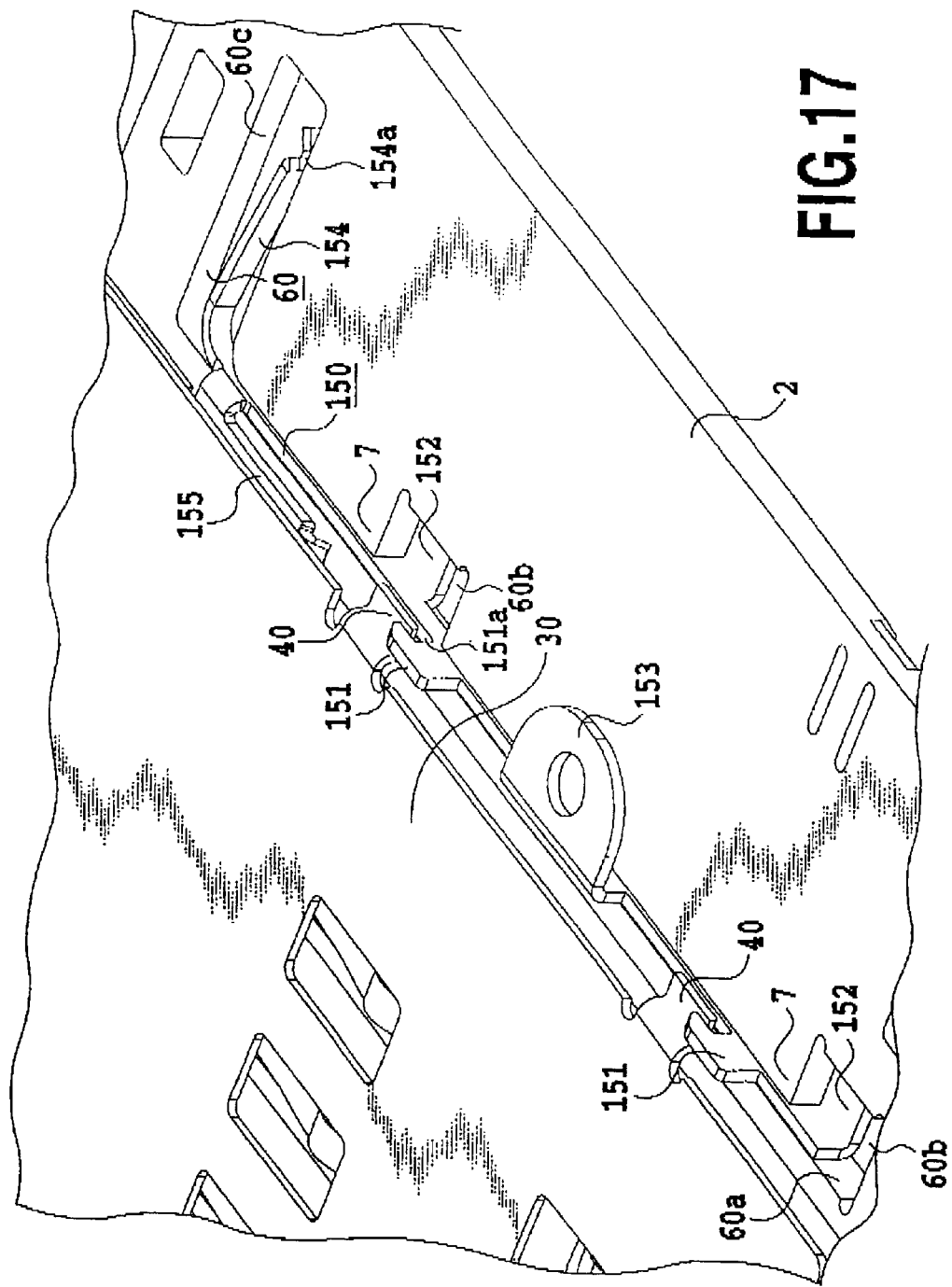

CARD CONNECTOR

This application is based on Japanese Patent Application Nos. 2001-032753 filed Feb. 8, 2001 and 2001-032754 filed Feb. 8, 2001, the contents of which are incorporated hereinto by reference.

BACKGROUND OF THE INVENTION

1. Field of the Invention

The present invention relates to a card connector, more particularly to a card connector capable of being built into various electronic apparatuses such as PDAs (personal digital assistants), cellular phones, telephones, portable audio products and cameras.

2. Description of the Related Art

Known IC cards have memory and/or an IC for serving as a control circuit. By loading such an IC card into electronic apparatuses, such as a cellular phone, a telephone, a PDA, and a digital camera, functions of these electronic apparatuses can be enhanced. Examples of such IC cards include memory cards such as Subscriber Identity Module Card® (SIM card), Multi Media Card® (MMC), Smart Media®, Secure Digital Card® (SD card), Memory Stick®, and Compact Flash Card®.

Card connectors allow these IC cards to removably connect with electronic apparatuses. The card connector is built into the electronic apparatus. The card connector generally has a connector body including a card slot and a plurality of metal contact terminals. Each of contact terminals of the card connector comes to contact with a corresponding contact pad arranged on a front face or a rear face of the IC card when the IC card is inserted in the card slot. A contact between contact terminals of the card connector and contact pads of the IC card allows electrical connection between the electric apparatus and the IC card. That is, the contact pads of the IC card include power-source pads to be connected to a power source and a plurality of signal pads for transmitting and receiving various signals. These contact pads are respectively connected to a power source circuit or various signal processing circuits of the electronic apparatus through a plurality of contact terminals of the card connector.

For example, if a certain SIM card is connected to a cellular phone, the cellular phone serves as exclusive one for a proprietor of SIM card. Therefore, if different SIM cards are allowed to connect to one cellular phone, the cellular phone can be used independently by plural users on a shared basis.

The card connector for a SIM card is disclosed, for example, in Japanese Patent Application Laid-Open No. 9-185973 (1997). This card connector has a base (connector body) made of a resin, and a cover which is hinged on the base and has a card slot. The SIM card can be slidably inserted in the cord slot of the cover. The base has contact terminals which are arranged thereon and can contact with the contact pads of SIM card. Further, this card connector has a lock mechanism for keeping the cover in a closed state. The lock mechanism includes locking protrusions extending from both sides of the cover and elastic pieces disposed on the base. The elastic pieces of the base have holes into which the locking protrusions of the cover can respectively fit.

However, in the above-mentioned conventional card connector, since the IC card is inserted in the card slot of the cover, the weight of the cover side is increased. Thus, the card is liable to slip from the card slot of the cover. Further, in the above-mentioned conventional lock mechanism, the locking protrusions are disposed at the both sides of the cover and the elastic pieces are disposed on the base so as to mate with the corresponding locking protrusion. Because of this configuration, thickness and width of the base and the cover increase around the locking protrusions and the elastic pieces, and consequently both side portions of the card connector become bulky. Moreover, in the conventional card connector, since the cover and the base are locked to each other at the sides of these members, locking strength is not sufficient and hence the cover may be opened accidentally.

Furthermore, in the prior art, in order to open the cover, the user must hold the cover by grasping it with fingers and then pull it up in a predetermined direction so that an engagement between the locking protrusions and the elastic pieces is released. However, this operation makes an insertion and a removal of the IC card cumbersome. Further, in the prior art, since the cover is still approaching the connector body after the locking between the base and the cover has been released, it is not easy to pivotally move the cover. Moreover, when releasing the engagement between the locking protrusions and the elastic pieces, the locking protrusions may be permanently deformed or be broken. The permanent deformation or the break of the locking protrusions result in an incompleteness of the locking. Further, in the prior art, since elastic pieces engaging with the locking protrusion are formed together with the base in one piece, the elastic pieces are liable to be permanently deformed or be broken and the structure of the base becomes complex.

SUMMARY OF THE INVENTION

It is an object of the present invention to solve the above-described problems. The present invention provides a simple and compact hinged card connector which can accommodate an IC card securely and facilitate locking a cover to the card connector and releasing the lock.

One aspect of the present invention relates to a card connector for an IC card comprising a connector body, a card slot, a pivotal pin, a cover, and a locking portion.

The card slot is formed in the connector body and has contact terminals adapted to respectively contact with a corresponding contact pad of the IC card when the IC card is positioned therein. The pivotal pin is supported by the connector body. The cover is pivotally supported by the pivotal pin at a first (proximal) edge portion thereof. The cover has a hook at a second (distal) edge portion opposite to the first edge portion. The cover can be pivotally moved about the pivotal pin to cover and expose the card slot and moved with respect to the connector body along the pivotal pin in a closed state. The locking portion is disposed in the connector body. The locking portion can engage with the hook of the cover when the cover is moved along the pivotal pin in the closed state, thereby restricting a pivotal movement of the cover for exposing the card slot or the card.

According to this card connector, the cover can be easily locked to the connector body only by moving the cover along the pivotal pin. Also, the lock can be easily released only by moving the cover along the pivotal pin. Moreover, since the card is accommodated in the connector body rather than the cover, the card connector securely holds the card without the cards slipping from the card slot. Furthermore, the hook is disposed not at the side portions of the cover but at the second edge portion, (i.e., at a distal edge portion) of the cover so that the side portions of the card connector do not become bulky. Therefore, the entire size of the card connector can be compact and the locking strength between the cover and the connector body can be increased.

Preferably, the hook is extended from the second edge potion of the cover and folded to define an engagement portion. The locking portion of the connector body is inserted into the engagement portion of the hook when the cover is moved along the pivotal pin in the closed state. With this configuration, the locking strength between the cover and the connector body can easily be increased.

Preferably, the card connector includes a protrusion extended from the first edge portion of the cover and a stopper portion disposed in the connector body. The stopper portion abuts against the protrusion of the cover to restrict a movement of the cover along the pivotal pin except when the cover is closed. Moreover, the card connector preferably includes a positioning portion formed in the connector body. The positioning portion provides a space in which the protrusion moves when the cover is positioned at an opening position at which the cover can be opened to expose the card slot or the card. These elements improve a handling ease and prevent an operating error when the cover is pivotally moved to cover or expose the card slot or the card.

Preferably, the card connector includes a first card slot for a small-sized card formed on one surface of the connector body and a second card slot for a large-sized card formed on the other surface of the connector body. In this case, the cover is pivotally supported by the pivotal pin to be capable of covering the first card slot.

Moreover, a longitudinal direction of the small-size card positioned in the first card slot is substantially perpendicular to a longitudinal direction of the large-size card positioned in the second slot. In this case, the first edge portion of the cover is substantially in parallel with the longitudinal direction of the small-size card positioned in the first card slot.

Another aspect of the present invention relates to card connector for an IC card comprising a connector body, a card slot, a pivotal pin, a grooved portion, and a locking member. The card slot is formed in the connector body and has contact terminals adapted to respectively contact with a corresponding contact pad of the IC card when the IC card is positioned therein. The pivotal pin is supported by the connector body. The grooved portion is formed on the connector body. The cover is pivotally supported by the pivotal pin at first (proximal) edge portion thereof and has a locking protrusion at a second (distal) edge portion opposite to the first edge portion. The cover can be pivotally moved about the pivotal pin to cover and expose the card slot. The locking member is disposed in the grooved portion of the connector body and can elastically deform in the grooved portion in response to a pressing force applied by the locking protrusion of the cover to engage with the locking protrusion when the cover is closed.

According to this card connector, the cover can be easily looked to the connector body only by moving the cover pivotally. Also, the lock can be easily released only by moving the cover pivotally. Moreover, since the card is accommodated in the connector body rather than the cover, the card connector securely holds the card without the card slipping from the card slot. Furthermore, the hook is disposed not at the side portions of the cover but at the second edge portion (i.e., a distal edge portion) of the cover so that the side portions of the card connector do not become bulky. Therefore, the entire size of the card connector can be compact and the locking strength between the cover and the connector body can be increased. In addition since the locking protrusion of the cover engages with the locking member which is separated from the connector body, the structure of the connector body can be simplified. If the cover and the locking member are made of metal, permanent deformation, break and the like of the locking protrusion and the locking member can be prevented effectively.

Preferably, the locking member comprises a main body, a hook portion, a cam surface and a first spring portion. The hook portion projects from the main body to engage with the locking protrusion of the cover. The cam surface is formed on the hook portion. The first spring portion allows the main body to move in grooved portion so that the hook portion and the locking protrusion of the cover can engage with each other. Moreover, the first spring portion applies a force to the main body so that the engagement between the hook portion and the locking protrusion is securely maintained. Such a configuration enables easy engagement between the hook portion of the locking member and the locking protrusion of the cover and increases a locking strength between the cover and the connector body.

Preferably, the grooved portion includes a first groove for the main body extending substantially in parallel with the second edge portion of the cover and a second groove for the first spring portion.

Preferably, the hook portion, the cam surface, and the first spring portion are formed together with the main body in one piece.

Preferably, the locking member includes a second spring portion for applying a force to the cover so that the cover is pivotally moved in a direction in which the card slot or the card is exposed. When the engagement between the locking protrusion of the cover and the locking member is released, the second spring automatically moves the cover pivotally to some extent in the direction in which the card slot or the card is exposed. The second spring facilitates an opening operation of the cover for exposing the card slot or the card.

Preferably, the second spring portion is formed together with the main body in one piece.

Preferably, locking member includes a knob used to move the main body in the grooved portion so that an engagement between the hook portion and the locking protrusion of the cover is released.

Preferably, the card connector includes a first card slot for a small-sized card formed on one surface of the connector body and a second card slot for a large-sized card formed on the other surface of the connector body. In this case, the cover is pivotally supported by the pivotal pin to be capable of covering the first card slot.

Moreover, a longitudinal direction of the small-size card positioned in the first card slot is substantially perpendicular to a longitudinal direction of the large-size card positioned in the second slot. In this case, the first edge portion of the cover is substantially in parallel with the longitudinal direction of the small-size card positioned in the first card slot.

The above and other objects, effects, features and advantages of the present invention will become more apparent from the following description of embodiments thereof taken in conjunction with the accompanying drawings.

BRIEF DESCRIPTION OF THE DRAWINGS

FIG. 17 is a partially enlarged perspective view of the second embodiment of the present invention showing the state just after the cover has been locked to the connector body.

DETAILED DESCRIPTION OF PREFERRED EMBODIMENTS

Figure 1:
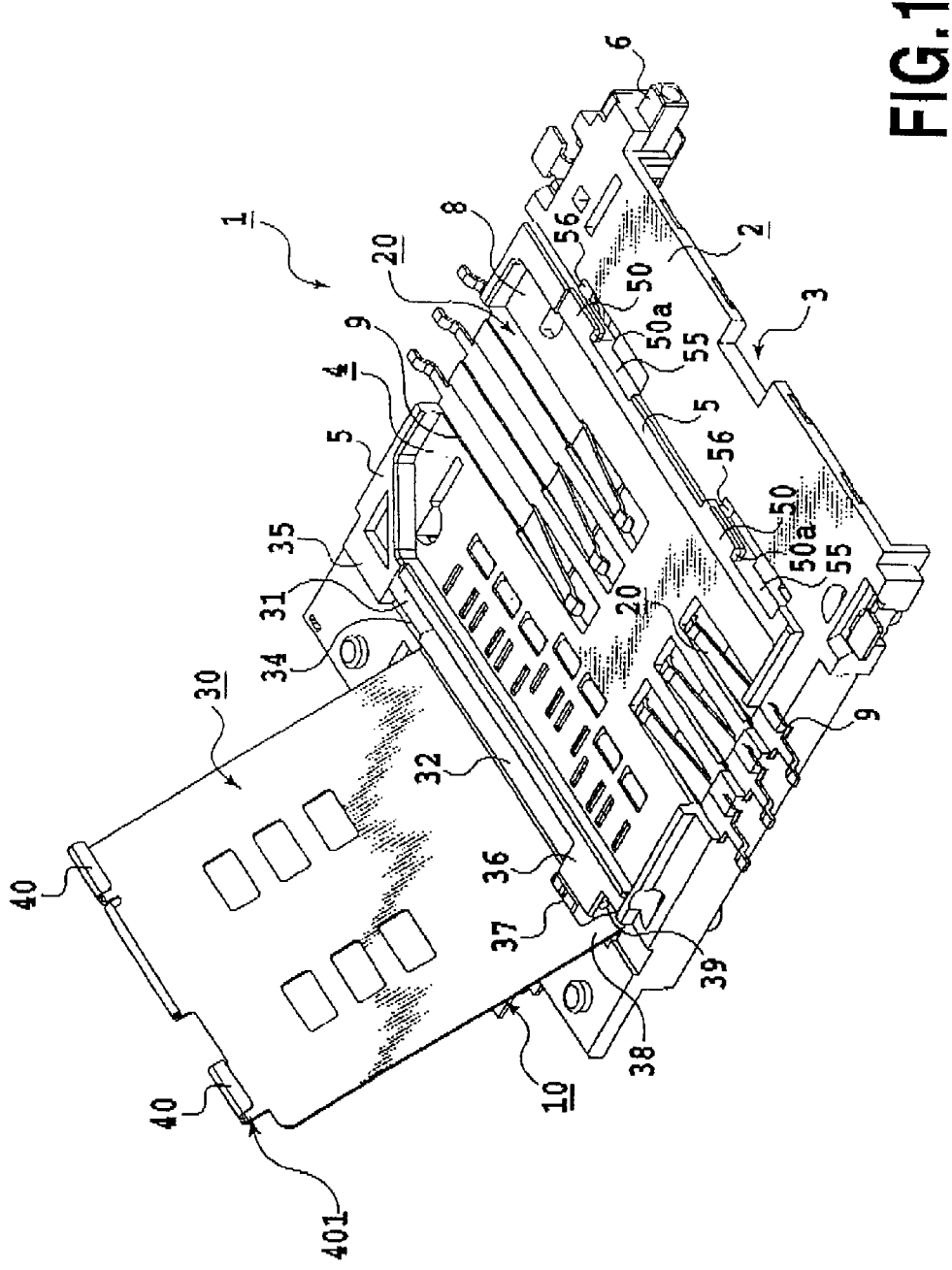
FIG. 1 is a perspective view of the first embodiment of the present invention showing the card connector with the cover opened.

Preferred embodiments of the present invention will be described below in detail with reference to the accompanying drawings.

(First Embodiment)

FIGS. 1–9 show the first embodiment of the card connector according to the present invention.

A card connector 1 shown in these figures is the one which can accommodate two kinds of IC cards each having a different size (a large-size card and a small-size card) at the same time. The card connector 1 comprises a connector body 2 and cover 30. The connector body 2 is made of an insulation material such as a resin. The connector body 2 has a depressed card slot 3 for accommodating the large-size card which is located on a lower side (one side) thereof and a depressed card slot 4 for accommodating the small-size card which is located on an upper side (the other side) thereof. The large-size card can be inserted in the lower card slot 3 of the card connector 1 by a sliding insertion manner (so-called side-loading). The small-size card can be inserted in the upper card slot 4 of the card connector 1 by so-called top-loading manner. The card connector 1 of this embodiment can be built into, for example, a personal digital assistant (PDA), a cellular phone and the like.

Examples of the large-size card include MMC card. Various contents such as music and games can be stored in MMC card. The large-size card includes a plurality of contact pads (in this case, seven contact pads) which are arranged on a lower surface thereof. In this case, the dimension in a widthwise direction of the large-size card is substantially identical to the dimension in the longitudinal direction of the small-size card.

Examples of the small-size card include SIM card. The SIM card can store normally various pieces of information such as a subscriber ID of the cellular phone and the like. The small-size card includes a plurality of contact pads (in this case, six contact pads) which are arranged on a lower surface thereof.

A plurality of (seven) contact terminals 10 are arranged on a ceiling surface of the lower card slot 3. Each of contact terminals 10 are respectively positioned and fixed by press-in manner in a corresponding depressed portion (not shown) formed on the ceiling surface. Further, guide ways (not shown) for guiding the large-size card are formed on both sides of the lower card slot 3. The large-size card is inserted into and detached from the card slot 3 along the guide way with the contact pads thereof facing upward (toward the ceiling surface).

Figure 4:
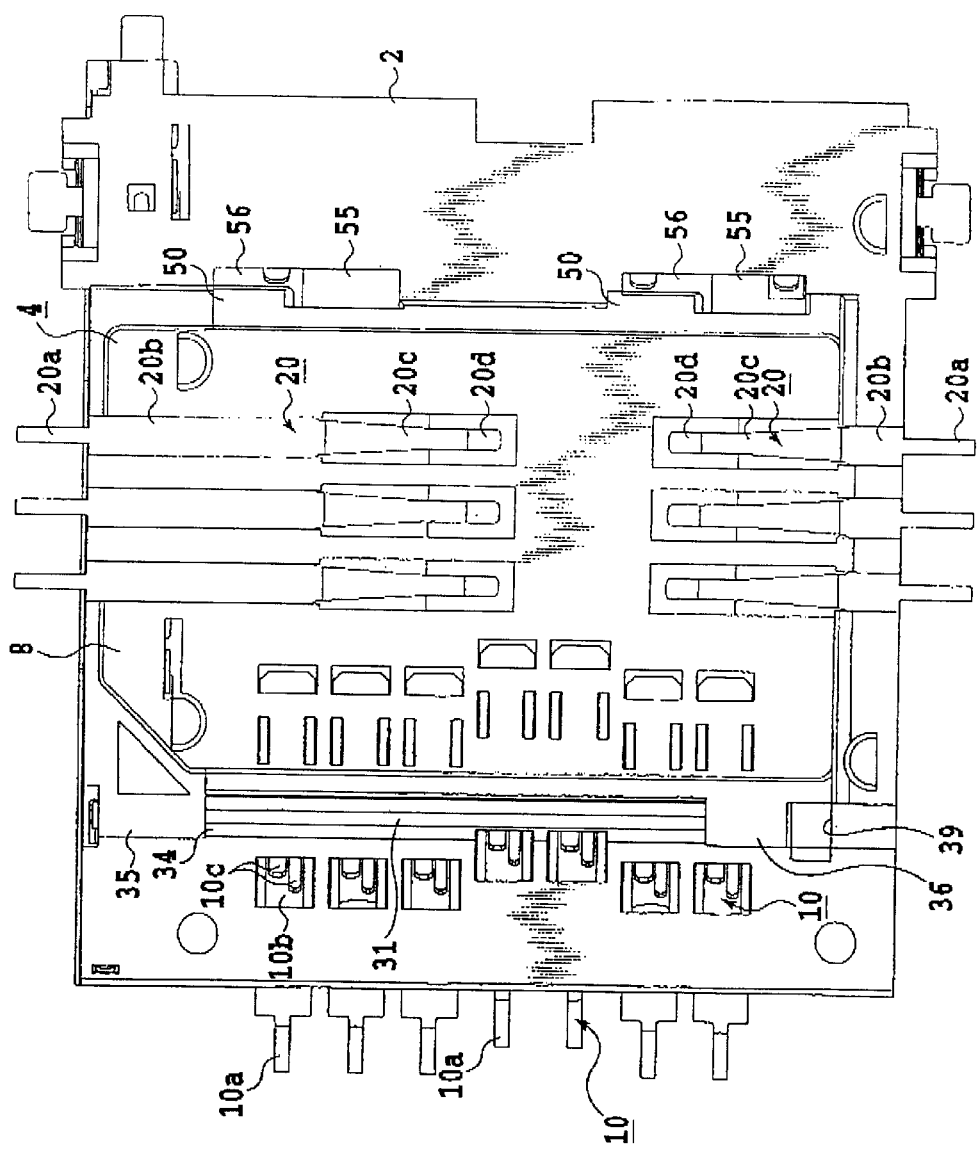
FIG. 4 is a plan view of the connector body of the card connector shown in FIGS. 1, 2 and 3.

Each of contact terminals 10 is a folded contact spring. As shown in FIG. 4, each contact terminal 10 includes a solder portion 10a to be connected to a contact pad of a printed circuit board of an electronic apparatus by soldering, a fixed portion 10b to be fixed in the depressed portion by press-in, and a spring piece 10c extending from the fixed portion 10b toward the soldering portion 10a, the spring piece 10c capable of deforming elastically. The spring piece 10c has a contact which protrudes downward therefrom and can abut against the contact pad of the large-size card. That is, when the large-size card is inserted into the lower card slot 3 with its contact pads facing upward, each contact pad of the large-size card comes to contact with the corresponding spring piece 10c of each contact terminal 10 of the card slot 3.

A card ejecting mechanism (not shown) including an eject lever 6 is disposed in a side portion of the lower card slot 3. When the large-size card is inserted into the lower card slot 3 until it reaches a predetermined position (electrical connection position), the large-size card is locked in the predetermined position by the card ejecting mechanism. When the eject lever 6 is pressed, the look is released by the card ejecting mechanism and then the large-size card is ejected from the card slot 3.

On the other hand, the card slot 4 is defined by frameworks 5 on the upper surface of the connector body 2. A top of the card slot 4 is opened. The small-size card is fitted in the card slot 4 by top-loading manner. The card connector 1 has a plurality of (six) contact terminals 20 for the small-size card and a plurality of depressed portions 9 formed on a bottom surface 8 of the upper card slot 4. Each of contact terminals 20 is positioned and fixed in the corresponding depressed portion 9 by press-in.

As shown in FIG. 4 and the like, contact terminals 20 for the small-size card includes two kinds of contact springs each in the form of a cantilever, one contact spring having an elongated body and the other contact spring having a shortened body. Each of contact terminals 20 has a solder portion 20a to be connected to the contact pad of the printed circuit board of the electronic apparatus by soldering, a fixed portion 20b to be fixed in the depressed portion 9, and a spring piece 20c capable of elastic deforming. The spring piece 20c has a contact 20d which protrudes upward and can abut against the contact pad of the small-size card.

A longitudinal direction of the contact terminal 20 fixed in the depressed portion 9 for the small-size card is substantially perpendicular to a longitudinal direction of the contact terminals 10 for the large-size card. Thus, the longitudinal direction of the small-size card accommodated in the upper card slot 4 is substantially perpendicular to the longitudinal direction of the large-size card accommodated the lower card slot 3. When the small-size card is fit in the upper card slot 4 with the contact pads thereof facing downward, each contact pad of the small-size card come to contact with the contact 20d of each contact terminal 20.

Now, the cover 30 of the card connector 1 will be described. The cover 30 is made of a sheet metal. The cover 30 is hinged on the connector body 2 at a first (proximal) edge portion thereof. That is, one of edge portions of the cover 30 is formed to be tubular. Thus, the cover 30 has a tubular insertion portion 32 through which a pivotal pin 31 can be inserted. The insertion portion 32 with the pivotal pin 31 inserted therethrough is disposed in an elongated hole 34 formed on the connector body 2. The elongated hole 34 is formed on the connector body 2 along the card slot 4. The elongated hole 34 is substantially in parallel with the longitudinal direction of the upper card slot 4 for small-size card. Accordingly, the insertion portion 32 (the first edge portion) of the cover 30 is substantially in parallel with the longitudinal direction of the small-size card accommodated in the upper card slot 4.

Figure 5:
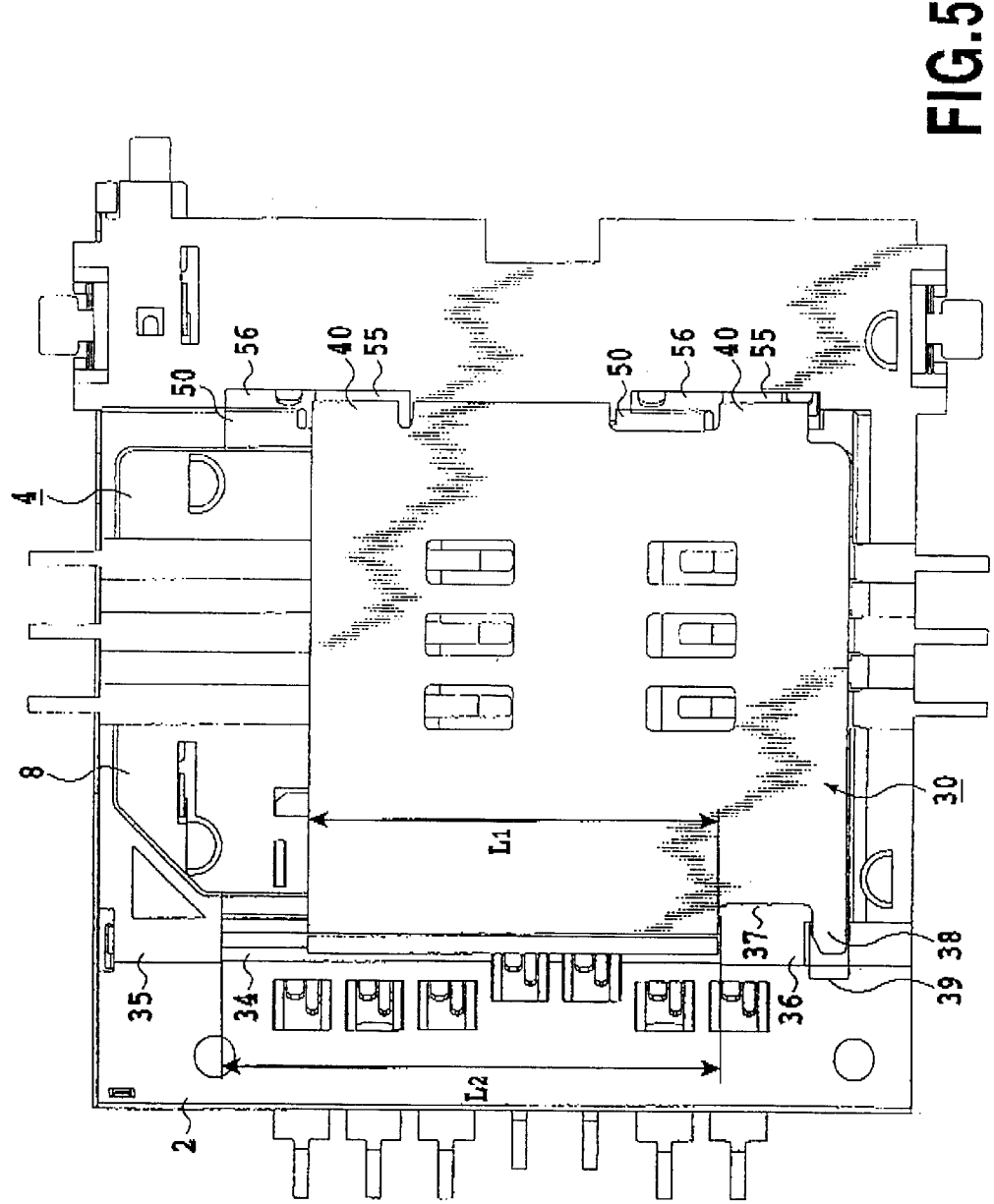
FIG. 5 is a plan view of the first embodiment of the present invention showing the card connector with the cover closed.

Both ends of the pivotal pin 31 projecting from the ends of the insertion portion 32 is supported by two pin support portions 35, 36 disposed in the connector body 2 to project from the framework 5. The length L1 of the insertion portion 32 of the cover 30 is shorter than the length L2 of the elongated hole 34 as shown in FIG. 5. Thus, the cover 30 can be slidably moved along the pivotal pin 31 within the elongated hole 34.

Moreover, the cover 30 has a cut-out portion 37 adjacent to the insertion portion 32 and a protrusion 38 adjacent to the cut-out portion 37. On the other hand, a positioning portion (hole) 39 is formed on the connector body 2 so as to be adjacent to the pin support portion 36. The positioning portion 39 is partially defined by the pin support portion 36. The protrusion 38 and the positioning portion are used to position the cover 30 at an opening position in which the cover 30 can be opened to expose the card slot 4 or the card. The positioning portion 39 provides a space in which the protrusion 38 moves when the cover 30 is opened.

Figure 2:
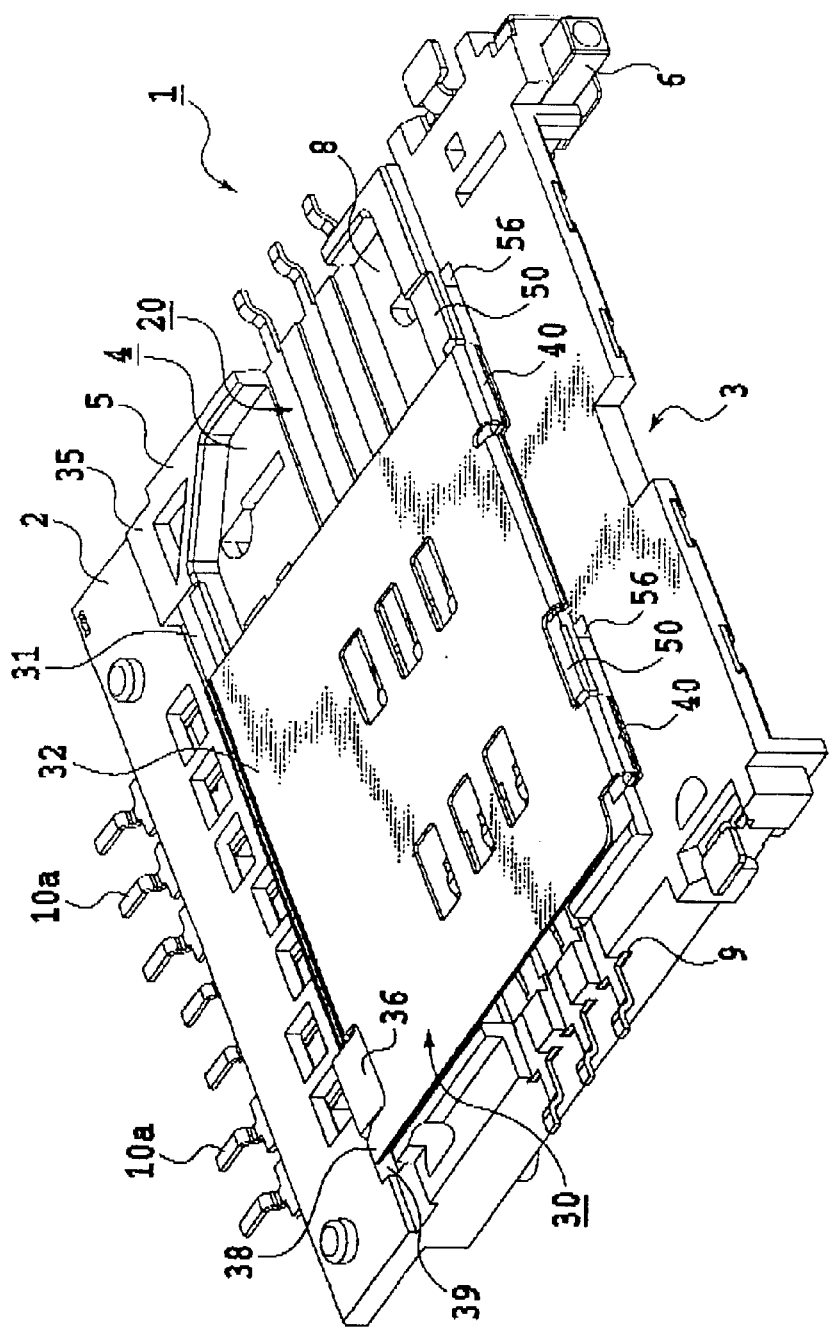
FIG. 2 is a perspective view of the first embodiment of present invention showing the card connector with the cover closed.
Figure 3:
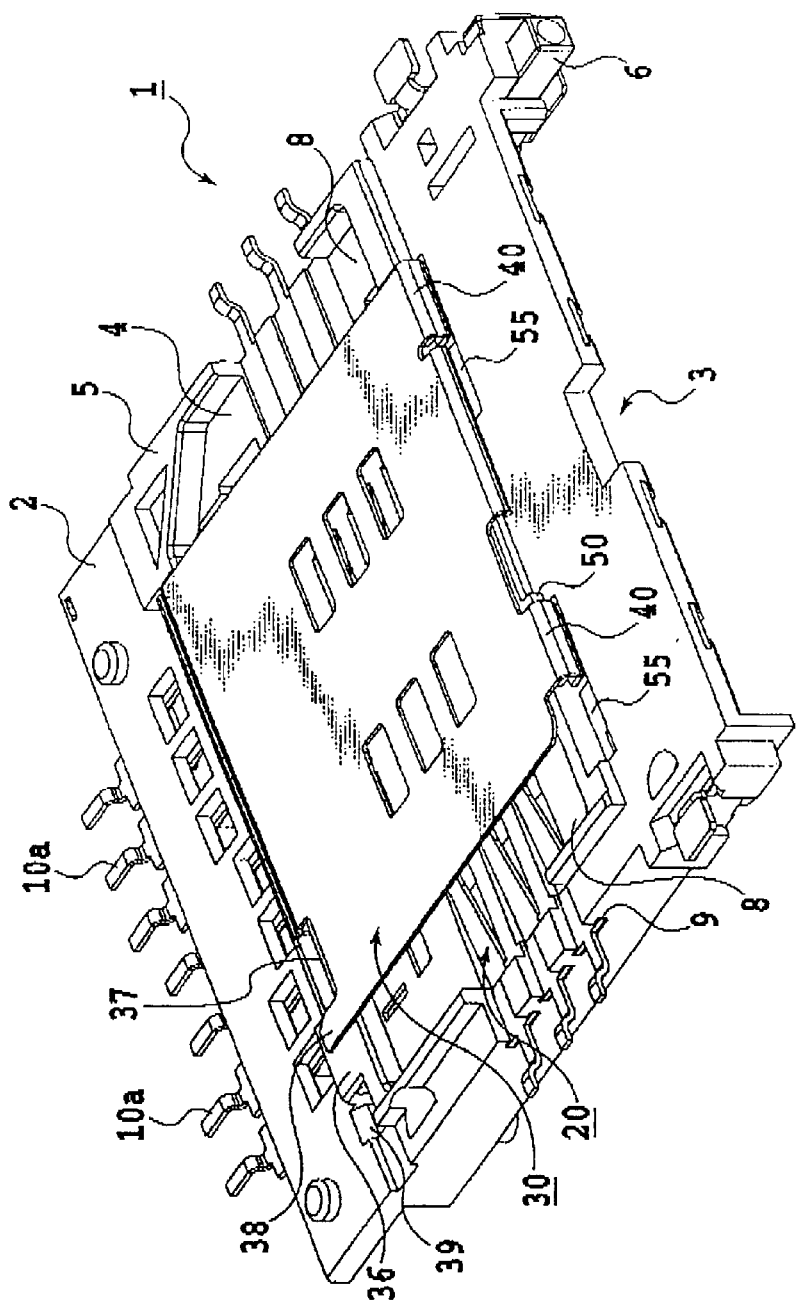
FIG. 3 is a perspective view of the first embodiment of the present invention showing the card connector with the cover locked to the connector body.

If the cover 30 is closed as shown in FIGS. 2 and 3, the protrusion 38 (cover 30) becomes substantially in parallel with the upper surface of the pin support portion 36 (bottom surface 8). Further, when the cover 30 is closed, a minute clearance is defined between the upper surface of the pin support portion 36 and the under surface of the protrusion 38. Thus, when closing the cover 30, the protrusion 38 or the cover 30 can be slidably moved along the pivotal pin 31 without interfere from the pin support portion 36.

As shown in FIG. 3, when the protrusion 38 is located above the pin support portion 36, even if the cover 30 is tried to be opened, the pin support portion 36 interferes with the protrusion 38 of the cover 30. Thus, when the protrusion 38 is located above the pin support portion 36, the cover 30 cannot be pivotally moved to expose the card slot 4 or the card. Accordingly, only when the cover 30 is positioned at the opening position in which the protrusion 38 meets correctly the positioning portion 39, the cover 30 can be opened.

On the other hand, when the cover 30 is opened as shown in FIG. 1, the protrusion 38 is located within the positioning portion 39. Therefore, even if the cover 30 is tried to be moved along the pivotal pin 31 in the opened state, the protrusion 38 abuts a wall surface of the pin support portion 36. That is, since the pin support portion 36 serves as a stopper potion for restricting the sliding movement of the cover 30, the cover 30 cannot be moved beyond the pin support portion 36 in this case. As described above, the protrusion 38 of the cover 30, the positioning portion 39, and the pin support portion (stopper portion) 36 serve as positioning means which allows the cover to open only at the opening position.

As shown in FIGS. 1, 5, 8, and 9, the cover 30 has hooks 40 for locking the cover 30 in a closed state. In this embodiment, two hooks 40 extend from the second edge portion of the cover 30. Each hook 40 is folded in two so that its tip faces the insertion portion 32. Each hook 40 has a substantial "C" shape cross-section and defines an engagement portion 401.

On the other hand, two brim-like locking portions 50 are formed in the connector body 2 so as to engage with the corresponding hooks 40 of the cover 30. The locking portions 50 are arranged to opposite to the elongated hole 34 in which the insertion portion 32 of the cover 30 is disposed so that the upper card slot 4 is located between the elongated hole 34 and locking portions 50. When the locking portion 50 engages with the corresponding hook 40 of the cover 30, the pivotal movement of the cover 30 for exposing the upper card slot 4 or the small-size card is restricted.

Each locking portion 50 is extended from a side wall of the framework 5 opposing the elongated hole 34. The locking portion 50 has such a shape and a size as can be laterally fitted in the engagement portion 401 of the hook 40. Further, each locking portion 50 has a tapered portion 50a for facilitating insertion into the hook 40.

A depressed portion 56 is formed under each locking portion 50. Moreover, a depressed portion 55 is formed so as to be located in the vicinity of each depressed portion 56 and each locking portion 50. The depth of the depressed portion 55 is smaller than that of the depressed portion 56. The depth and position of the depressed portion 55 is determined to receive corresponding hook 40 of the cover 30 therein when the cover is closed.

Figure 8:
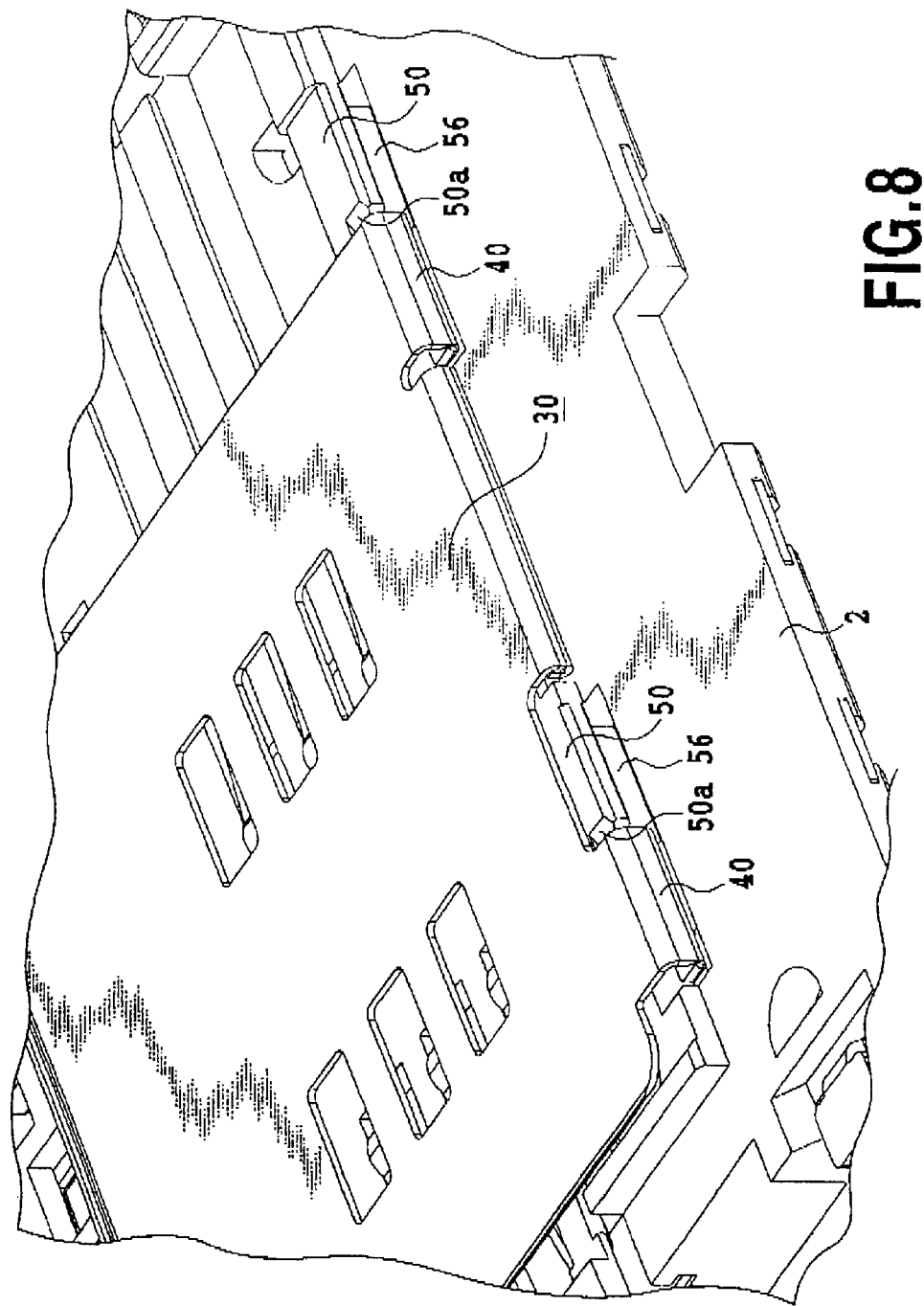
FIG. 8 is a partially enlarged perspective view of the first embodiment of present invention showing the card connector with the cover closed.

In the card connector 1, the protrusion portion 38 of the cover 30 is located within the positioning portion 39 of the connector body 2 while the cover 30 is opened as shown in FIG. 1. From this state, if the cover 30 is closed, each hook 40 of the cover 30 is received within the corresponding depressed portion 55 of the connector body 2 as shown in FIGS. 2, 5 and 8. At this time, the cover 30 (and protrusion 38) becomes substantially in parallel to the upper surface of pin support portion 36.

Figure 6:
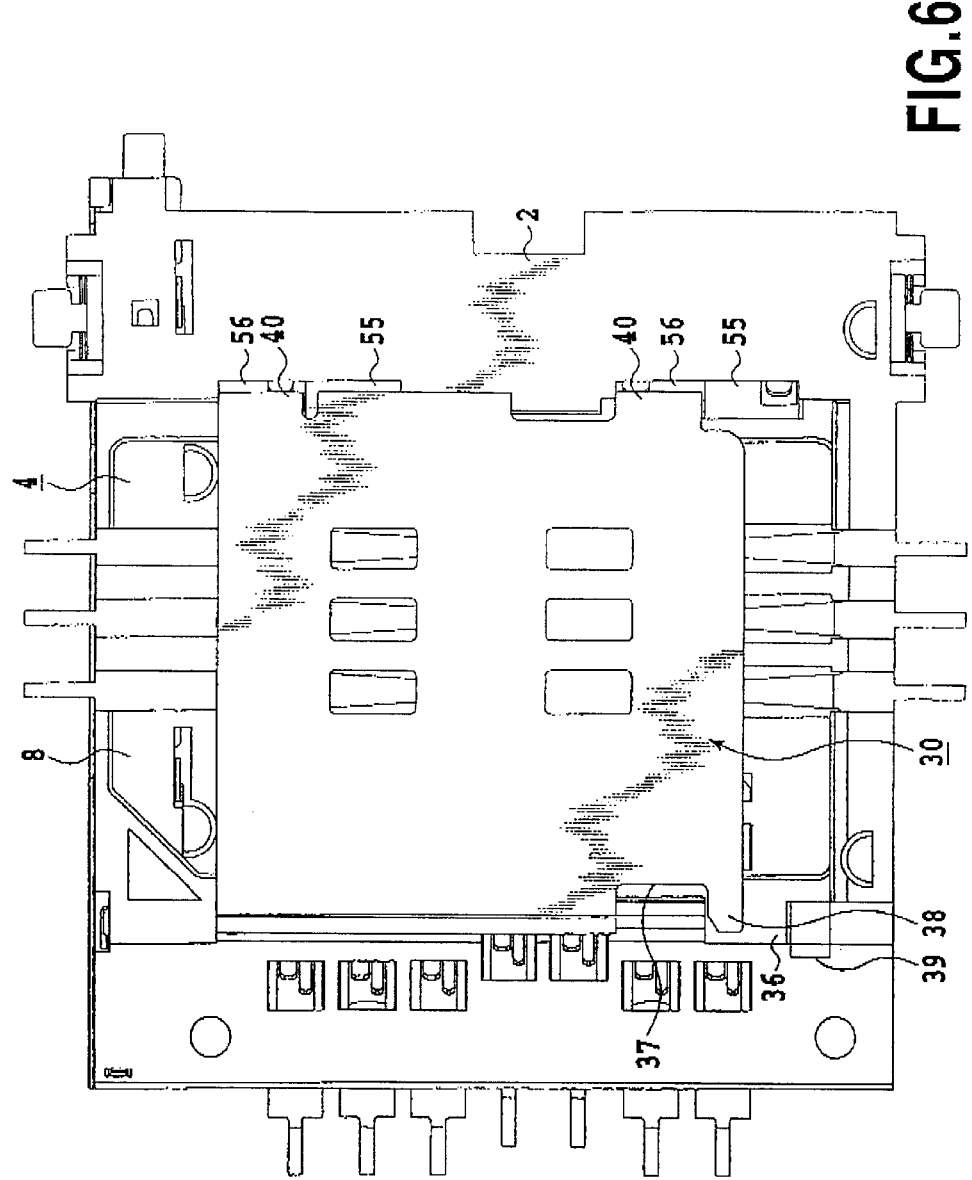
FIG. 6 is a plan view of the first embodiment of the present invention showing the card connector with the cover locked to the connector body.
Figure 7:
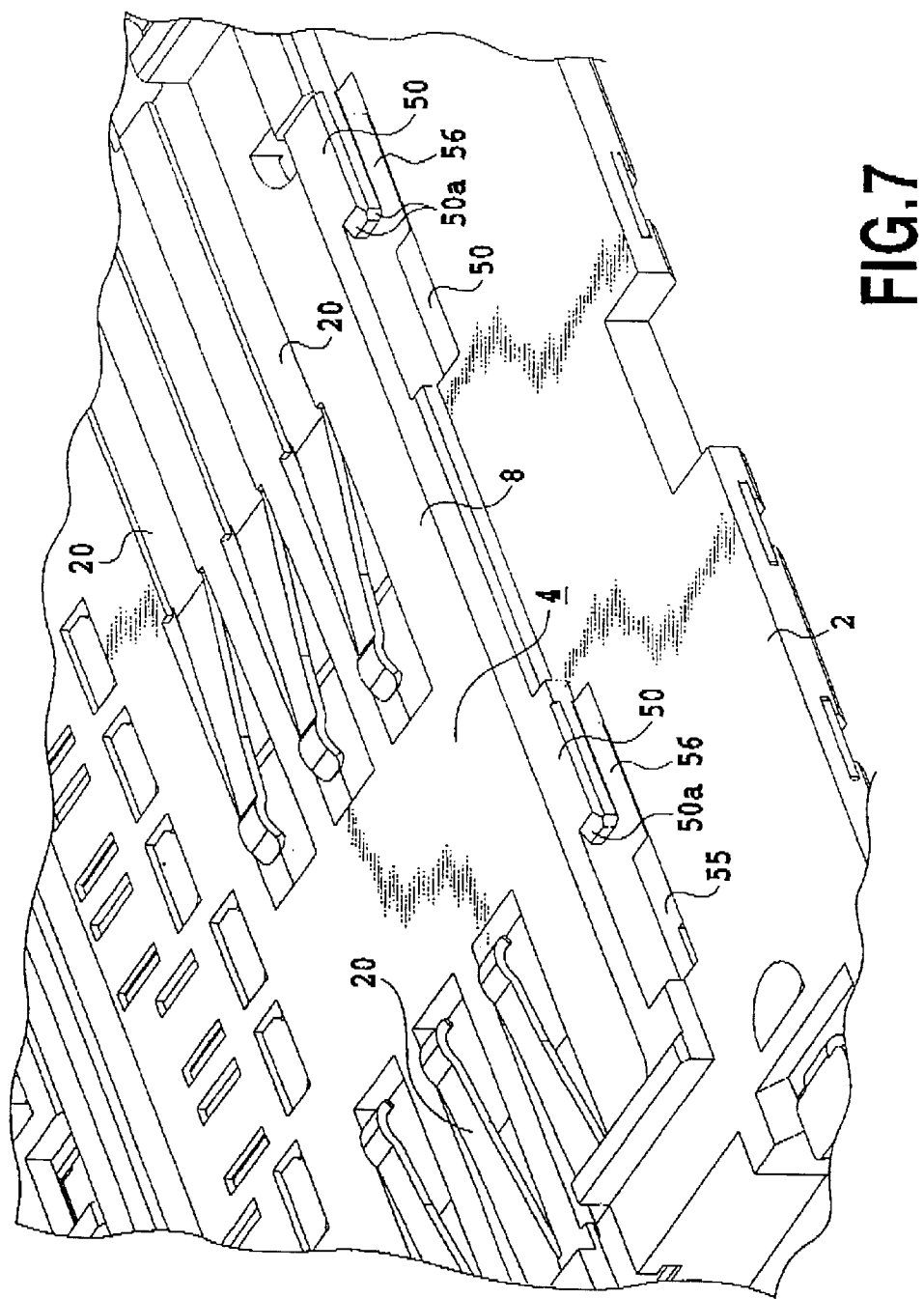
FIG. 7 is a partially enlarged perspective view of the first embodiment of present invention showing the card connector with the cover opened.
Figure 9:
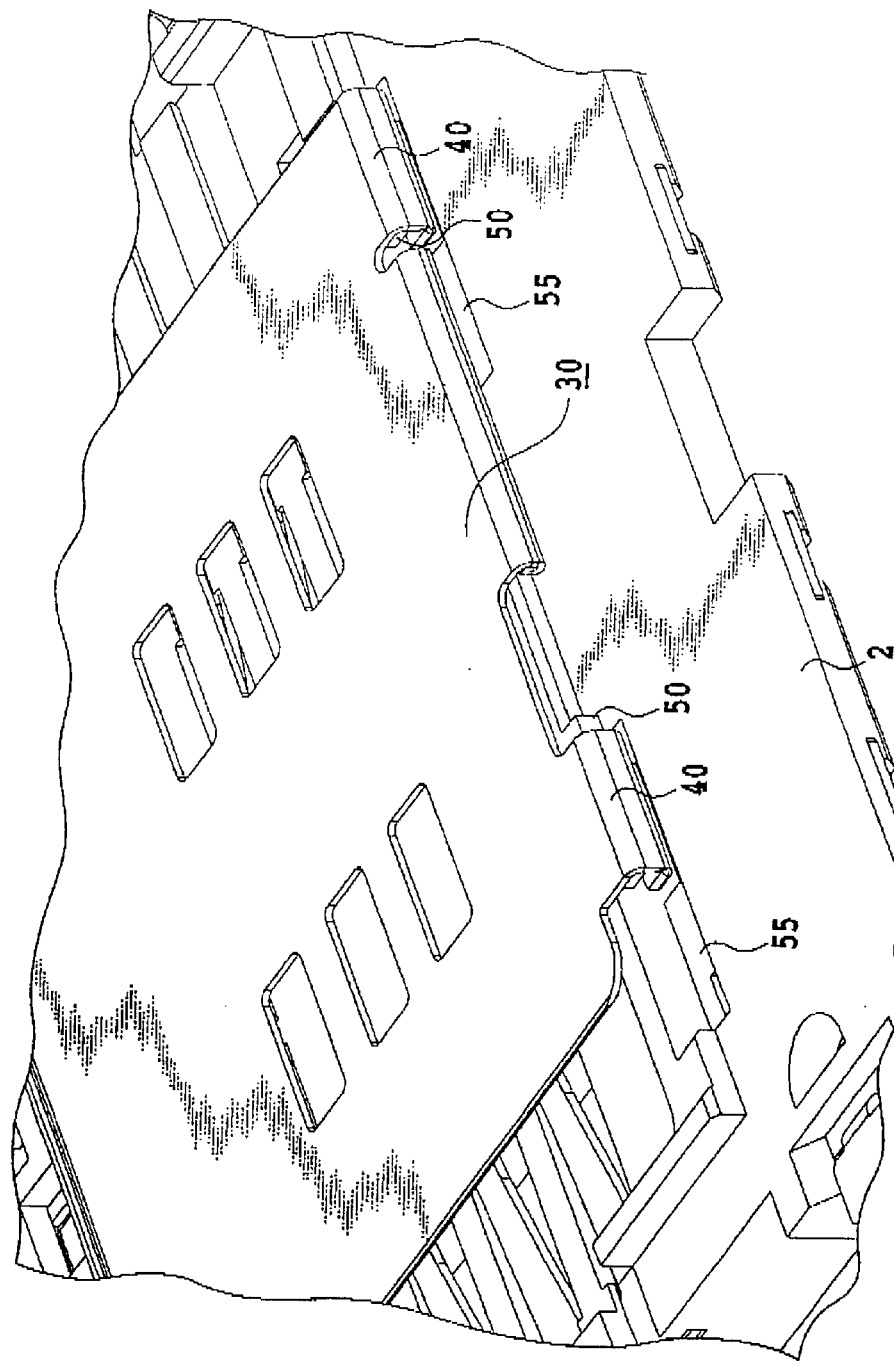
FIG. 9 is a partially enlarged perspective view of the first embodiment of present invention showing the card connector with the cover locked to the connector body.

Then, if the closed cover 30 is being moved along the pivotal pin 31 so that the hook 40 of the cover 30 travels from the depressed portion 55 toward the locking portion 50, the locking portion 50 is being inserted into the engagement portion 401 of the hook 40. As a result, the cover 30 is locked to the connector body 2 as shown in FIGS. 3, 6 and 9. On the contrary, if the cover 30 is intended to be opened, the cover 30 is moved along the pivotal pin 31 so that the hook 40 of the cover 30 travels toward the depressed portion 55. As a result, the engagement between each hook 40 and each locking portion 50 is released. In this state, the cover 30 is located at the opening position in which the protrusion 38 meets the positioning portion 39. Therefore, the cover 30 can be opened as shown in FIG. 1.

As described above, in the card connector 1, the cover 30 for the upper card slot 4 pivotally moves about the pivotal pin 31 extending substantially in parallel with the longitudinal direction of the small-size card. Further, the hooks 40 are disposed at the second (distal) edge portion of the cover 30. Therefore, it is possible to dispose the locking portions 50 for the cover 30 in the unused portion behind the lower card slot 3. As a result, it is possible to prevent an increase in size of the card connector 1 accompanied by provision of the locking means for the cover 30. It is understood that the pivotal pin may be disposed substantially perpendicular to the longitudinal direction of the small-size card. In this configuration, however, the size of the card connector may become somewhat larger, since this configuration requires a dedicated area for the locking portion in one side portion of the connector body.

Further, in the card connector 1, the cover 30 can be easily looked the connector body 2 only by moving the cover 30 along the pivotal pin 31. Also, the lock can be easily released only by moving the cover 30 along the pivotal pin 31. Moreover, in the card connector 1, both of the large-size card and the small-size card are accommodated, not in the cover 30, but in the connector body 2. Thus, the card connector 1 holds the cards securely without the cards slipping from the card slot 3 or 4. Furthermore, the card connector 1 improves a handling ease and prevents an operating error when the cover is pivotally moved to cover or expose the card slot 4 or the card. In addition, since the hooks 40 are disposed, not on the sides of the cover 30, but at the second (distal) edge portion of the cover 30, the locking strength between the cover 30 and the connector body 2 can be increased.

Moreover, in the card connector 1, the longitudinal direction of contact terminals 10 for the large-size card is substantially perpendicular to the longitudinal direction of contact terminals 20 for the small-size card. Thus, even if the lower card slot 3 and the upper card slot 4 oppose with each other, the depressed portion for the contact terminal 10 and the depressed portion 9 for contact terminal 20 do not oppose with each other As a result, it is possible to reduce the thickness of the connector body 2 with keeping the strength of connector body 2 sufficiently. Further, in the card connector 1, the solder portions 20b of the contact terminals 20 for the small-size card do not interfere with the solder portions 10a of the contact terminals 10 for the large-size card as shown in FIG. 2. Such a configuration facilitates a press-in working of each contact terminal, image recognition and image inspection of the soldered portion, a repair working with the use of a soldering iron and the like.

The card connector of this embodiment is not limited to the one for the above-described large-size and small-size cards. That is, the card connector of this embodiment may be adapted to only one kind of card. Further, the small-size card is not limited to SIM card and the large-size card is not limited to MMC card. Alternatively, the card connector of this embodiment may be adapted to Smart Media SD Card, Memory Stick, and Compact Flash Card. Moreover, the card connector of this embodiment may be adapted to various electronic apparatuses other than the PDAs or the cellular phone, for example, the portable audio instrument, the camera and the like.

(Second Embodiment)

FIGS. 10–17 show the second embodiment of the card connector according to the present invention. The same elements as those described with reference to the first embodiment are referred to same reference numerals and same description will be omitted.

The card connector 1A of the second embodiment also has the cover 30 hinged on the connector body 2 at first (proximal) edge portion thereof. The cover 30 can be pivotally moved about a pivotal axis (not shown) which is inserted in the insertion portion 132. In this embodiment, the length of the insertion portion 32 of the cover 30 is substantially identical to the length of the elongated hole 34. Therefore, the cover 30 can not move along pivotal axis. The cover 30 has locking protrusions 40A for locking the cover 30 in a closed state. In this embodiment, two locking protrusions 40A extend from the second (distal) edge portion of the cover 30. Each locking protrusion 40A is folded in two so that its tip extends toward a direction opposite to the insertion portion 32.

On the other hand, in the connector body 2, a grooved portion 60 is formed on the connector body 2. The grooved portions 60 is opposite to the elongated hole 34 in which the insertion portion 32 of the cover 30 is disposed so that the upper card slot 4 is located between the elongated hole 34 and grooved portions 60.

Figure 10:
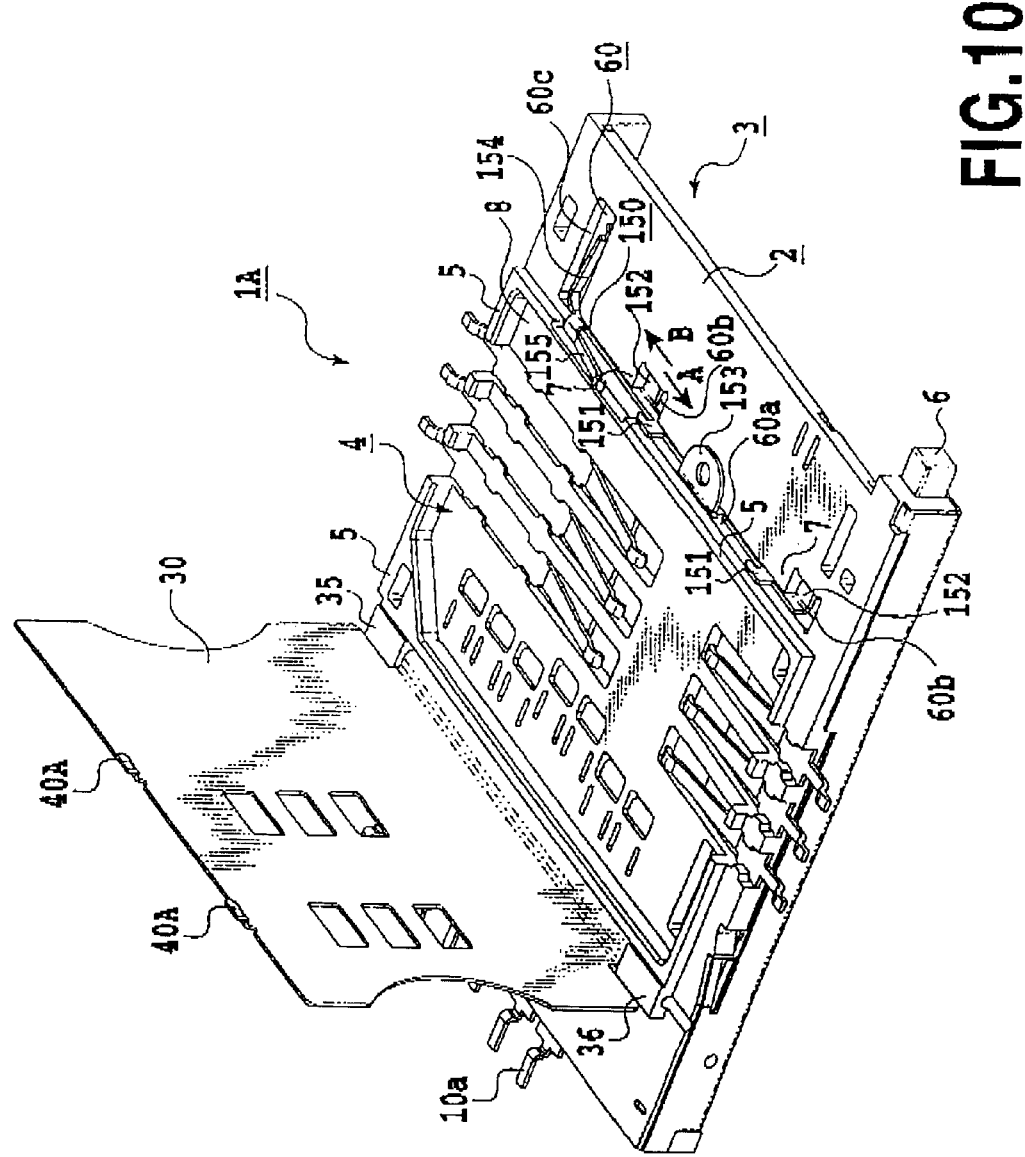
FIG. 10 is a perspective view showing the second embodiment of the present invention showing the card connector with the cover opened.

As shown in FIG. 10, a substantial "L" shaped locking member 150 is disposed in the grooved portion 60. The locking member 150 can elastically deform in the grooved portion 60 in response to a pressing force applied by the locking protrusions 40A of the cover 30 to engage with the locking protrusion 40A when the cover 30 is closed. The engagement between the locking protrusions 40A and the locking member 150 restrict the pivotal movement of the cover 30 for exposing the card slot 4 or the small-size card.

Figure 14:
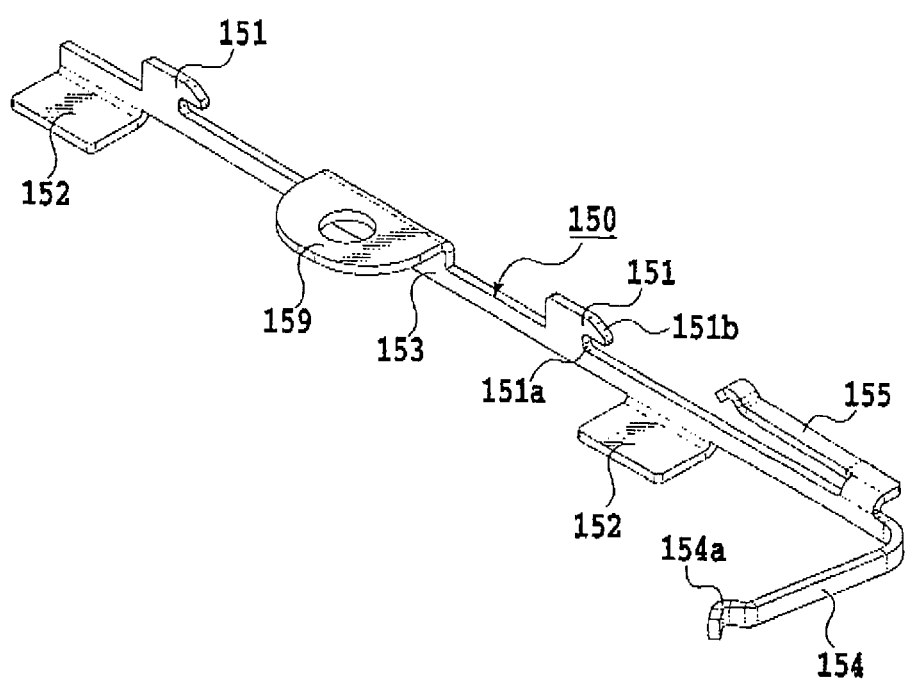
FIG. 14 is a perspective view showing the locking member of the card connector of the second embodiment.
Figure 15:
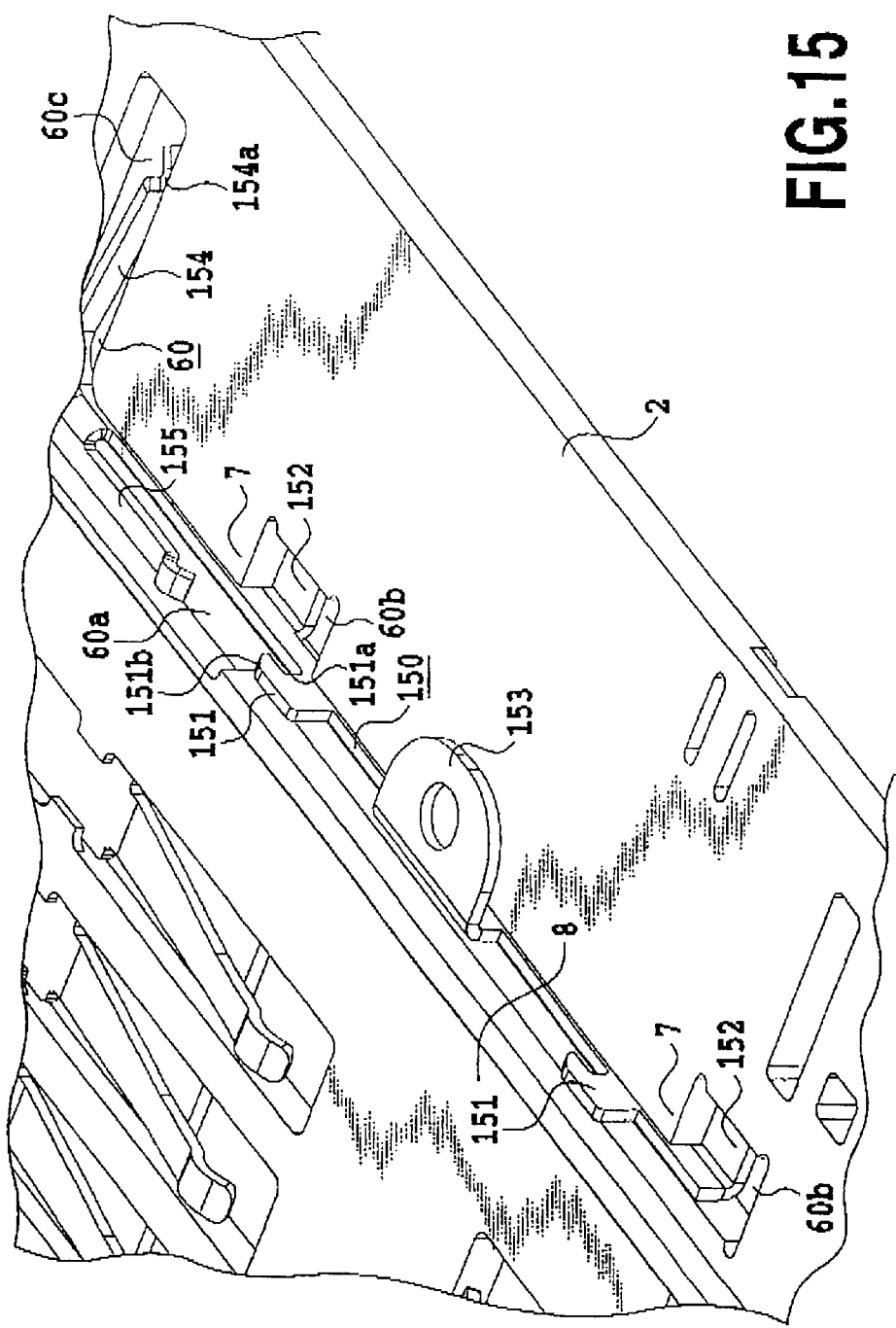
FIG. 15 is a partially enlarged perspective view of the second embodiment of the present invention showing the state in which the locking member is disposed in the grooved portion.

The locking member 150 is made of a metal. As shown in FIG. 14, the locking member 150 includes an elongated main body 159, two hook portions 151 protruding from two locations of the main body 159 and a first spring portion 154 extending in a direction substantially perpendicular to the main body 159. Each hook portion 151 is capable of engaging with the locking protrusion 40A of the cover 30. That is, each hook portion 151 has an engagement portion 151a extending substantially in parallel with the main body 159. The separation between the two hook portions 151 is substantially identical to the separation of the locking protrusions 40A of the cover 30. Moreover, the hook portion 151 has a slanted cam surface 151b on the upper portion thereof so that a pressing pressure of the locking protrusion 40A of the cover 30 can be converted to a force in a direction designated by an arrow A (FIG. 10).

The locking member 150 also includes a second spring portion 155 extended from a vicinity of the proximal end of the first spring portion 154. Further, the locking member 150 includes two projections 152 for restricting an upward movement of the main body 159 and a knob 153. The knob 153 is used to move the main body 159 within the grooved portion 60 in "B" direction so that an engagement between the hook portions 151 of the locking member 150 and the locking protrusion 40A of the cover 30 is released, The hook portions 151, the projections 152, the knob 153, the first spring portion 154, and the second spring portion 155 are formed together with the main body 159 in one piece.

Similarly with the locking member 150, the grooved portion 60 of the connector body 2 is also formed in substantial "L" shape. The grooved portion 60 has a first groove 60a extending substantially in parallel with the second (distal) edge portion of the cover 30 hinged on the connector body 2, two depressed portions 60b arranged so as to locate at the side of the respective hook portions 151, and a second groove 60c leading to one end of the first groove 60a at a substantially right angle. The first and second groove 60a, 60c and the depressed portions 60b are formed in serially communication with one another.

When the locking member 150 is disposed in the grooved portion 60, the main body 159 is positioned in the first groove 60a and the first spring portion 154 is positioned in the second groove 60c. Each of the projections 152 of the locking member 150 are received in the corresponding depressed portions 60b respectively and then inserted into a slit formed in a rear surface of portion 7 of the connector body 2. As a result, an upward displacement of the locking member 150 with respect to the connector body 2 is restricted. Each projection 152 can slidably move in the corresponding slit in directions designated by the arrows "A" and "B".

Figure 11:
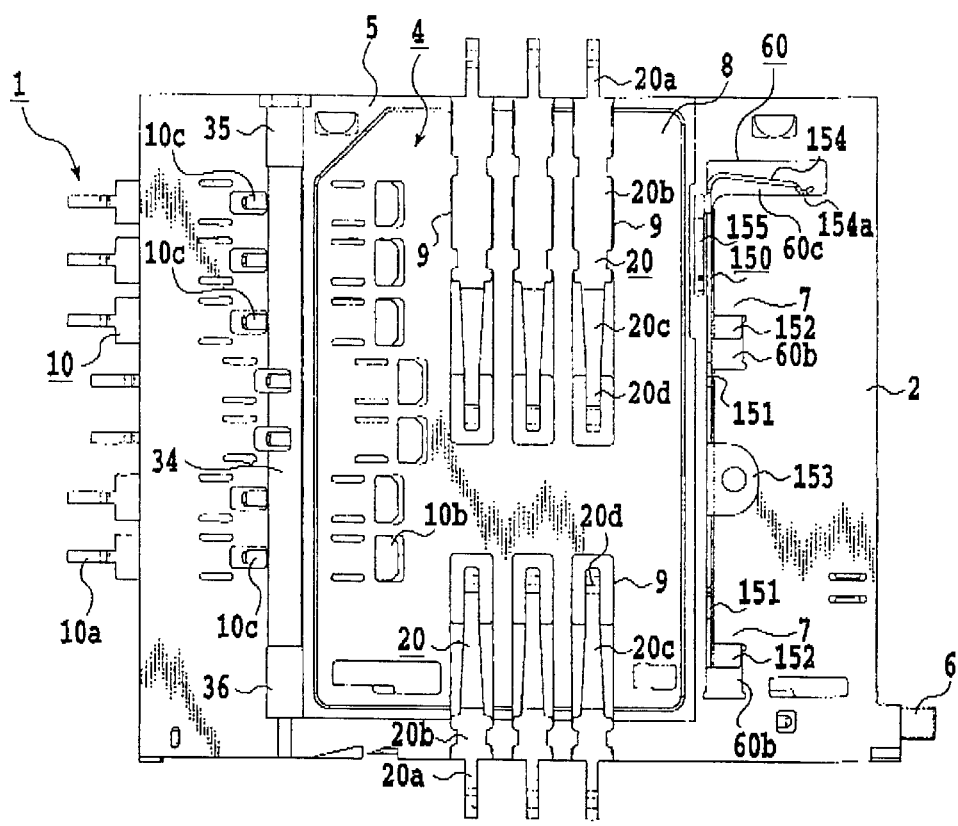
FIG. 11 is a plan view showing the connector body of the card connector of the second embodiment.
Figure 12:
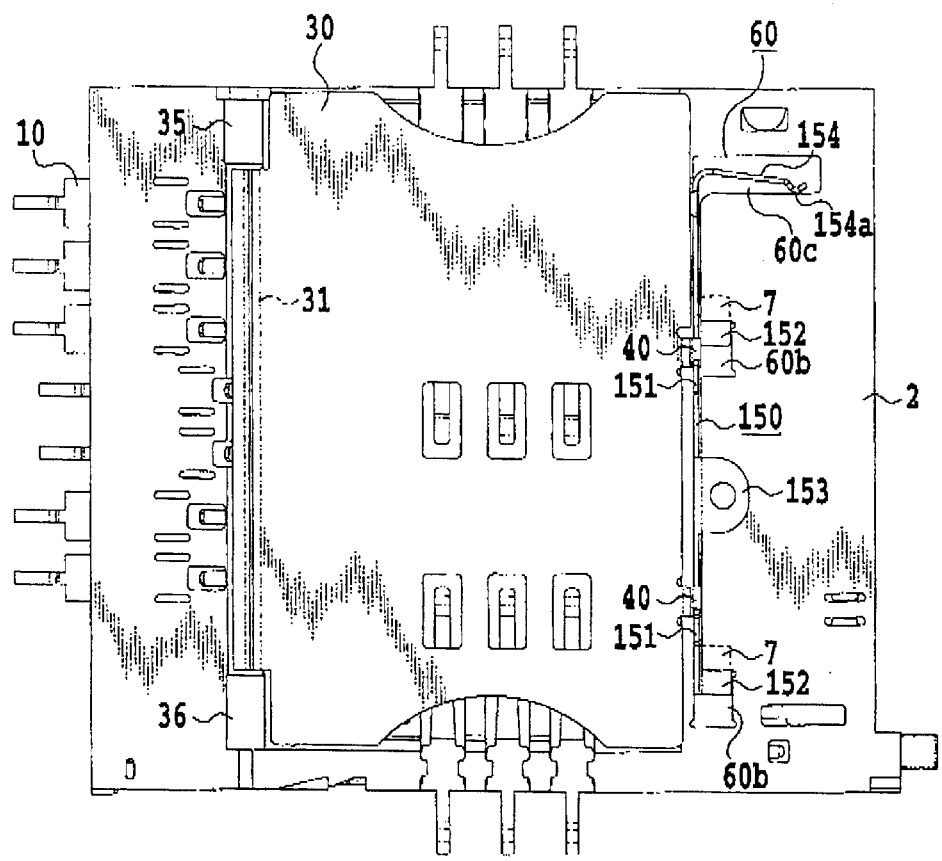
FIG. 12 is a plan view of the second embodiment of the present invention showing the card connector with the cover locked to the connector body.
Figure 13:
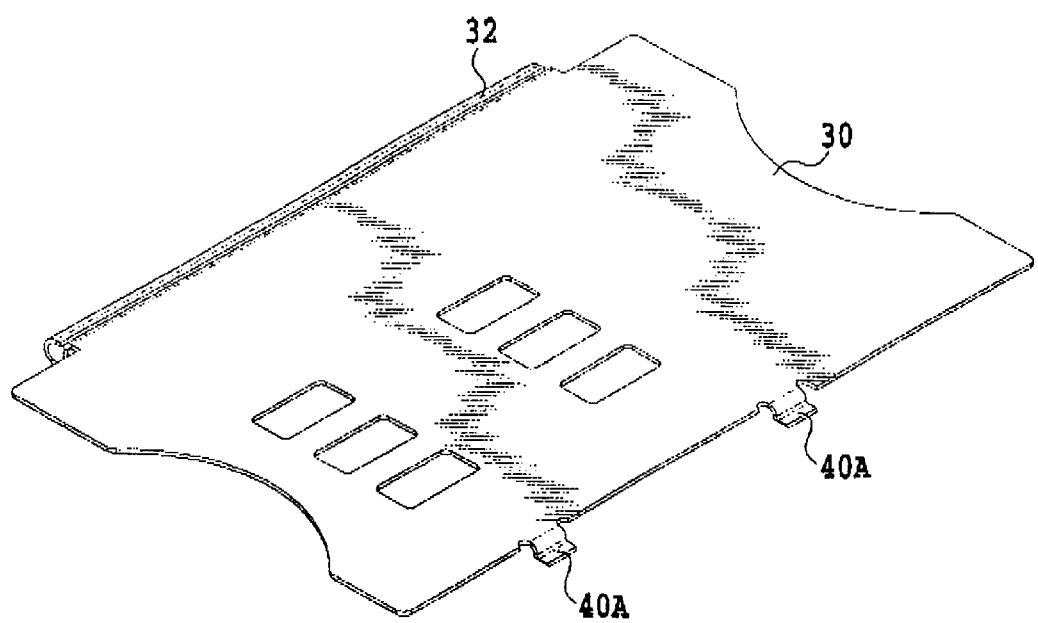
FIG. 13 is a perspective view showing the cover of the card connector of the second embodiment.

Here, the first spring portion 154 of the locking member 150 has a fulcrum portion 154a protruding like an arc as shown in FIG. 11. Thus, when the locking member 150 is disposed in the grooved portion 60, the main body 159 can be elastically displaced in the first groove 60a in "A" and "B" directions in FIG. 10. That is, the first spring portion 154 allows the main body 159 to move in "A" direction so that the hook portion 151a and the locking protrusion 40a of the cover 30 can engage with each other in response to pressing pressures applied to the cam surfaces 151b of the hook portions 151 by the locking protrusions 40A of the cover 30. Moreover, the first spring portion 154 serves to apply a force to the main body 159 in "B" direction so that the engagement between the hook portion 151 and the locking protrusion 151 is maintained after they have engaged with each other.

As shown in FIG. 14, the second spring portion 155 of the locking member 150 is supported to the main body 159 in a cantilever manner as shown in FIG. 14. Thus, when the engagement between the hook portion 151 and the locking protrusion 40A is released, the second spring portion 155 applies a force to the cover 30 so that the cover 30 is pivotally moved in a direction in which the card slot 4 or the card is exposed. As a result, when the lock is released the cover 30 automatically comes into a state in which it is opened partway.

Figure 16:
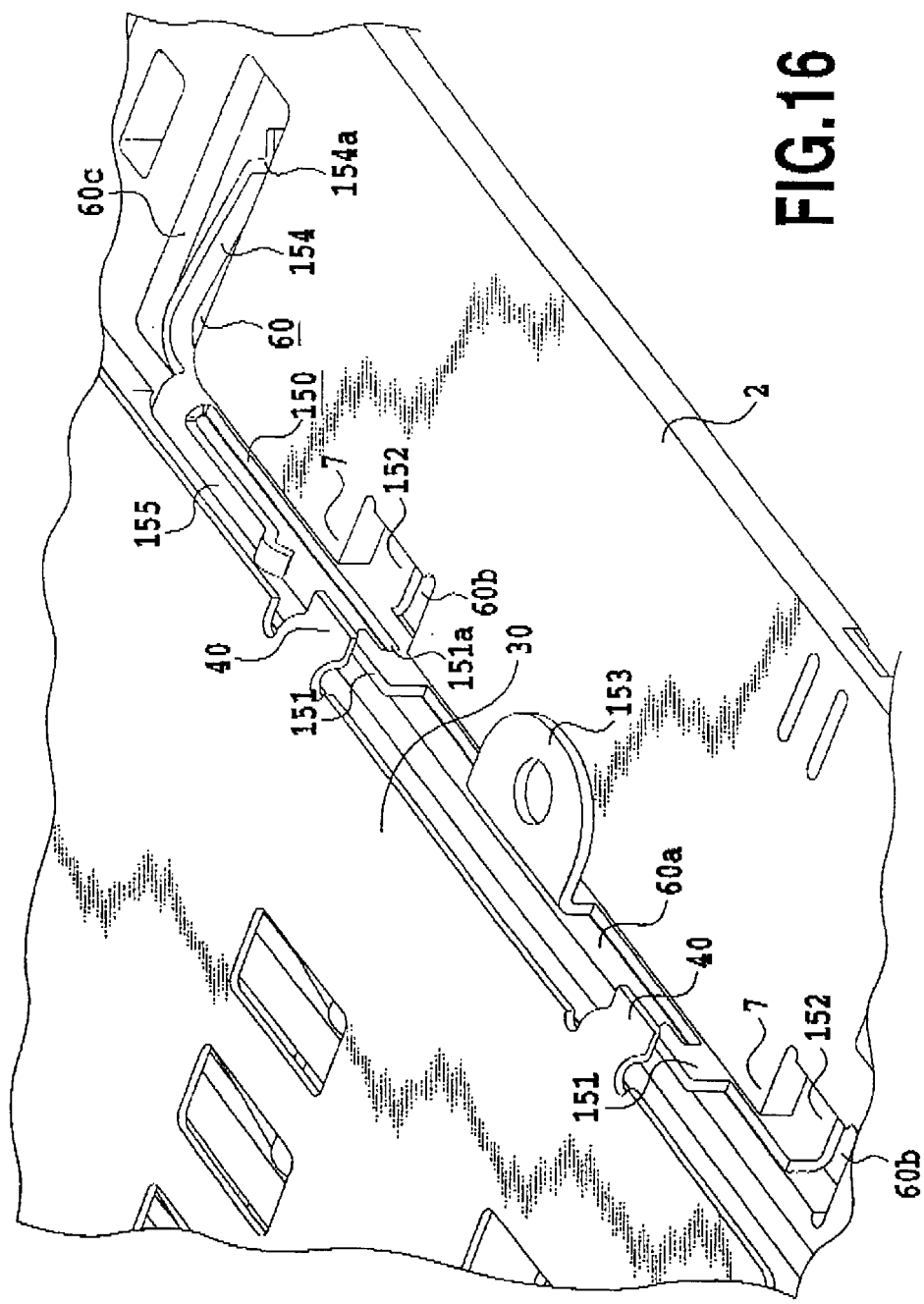
FIG. 16 is a partially enlarged perspective view of the second embodiment of the present invention showing the state just before the cover is locked to the connector body.

In the card connector 1A, if the cover 30 is closed from a opened state (FIG. 10), the cover 30 pivotally moves until it comes into a state shown in FIG. 16 and then each locking protrusion 40A abuts the corresponding hook portion 151 of the locking member 150. When the cover 30 is closed further, each locking protrusion 40A presses the cam surface 151b of each hook portion 151. As a result, the locking member 150 is slidably moved in "A" direction together with the hook portions 151 by means of elastic deformation of the first spring portion 154. Then, each locking protrusion 40A of the cover 30 cuts across the corresponding hook portion 151 and then engages with the engagement portion 151a of the hook portion 151.

When each locking protrusion 40A of the cover 30 has engaged with the corresponding hook portion 151, the pressing pressure against the hook portions 151 is released and the first spring portion 154 consequently recovers from a state in which it is elastically deformed. As a result, each hook 151 moves in "B" direction together with the locking member 150 as a whole. Therefore, as shown in FIG. 17, the locking protrusions 40A of the cover 30 fit the engaged portions 151a of the hook portions 151 sufficiently and the cover 30 is surely locked to the connector body 2.

On the other hand, when opening the cover 30, the locking member 150 (main body 159) is slightly moved with use of the knob 153 in "A" direction so that the first spring 154 deforms elastically. By this operation, the engagement between the locking protrusions 40A and the engagement portions 151a of the hook portions 151 (i.e., locking of the cover 30) is released. When the lock is released, since the cover 30 is being biased upward by the second spring portion 155 of the locking member 150, the cover automatically rises so as to make a certain degree of angles to the connector body 2.

Similarly with the card connector 1 of the first embodiment, in the card connector 1A, the cover 30 for the upper card slot 4 pivotally moves about the pivotal axis extending substantially in parallel with the longitudinal direction of the small-size card. Further, the locking protrusions 40A are disposed at the second (distal) edge of the cover 30. Therefore, it is possible to dispose the locking portions 50 for the cover 30 in the unused portion behind the lower card slot 3. As a result, it is possible to prevent an increase in size of the card connector 1A accompanied by provision of the locking means for the cover 30. It is understood that the pivotal pin may be disposed substantially perpendicular to the longitudinal direction of the small-size card. In this configuration, however, the size of the card connector may become somewhat larger, since this configuration requires a dedicated area for the locking portion in one side portion of the connector body.

Moreover, in the card connector 1A, the locking protrusions 40A of the cover 30 are securely engaged with the hook portions 151 of the locking member 150 in the connector body 2 so as to lock the cover 30 to the connector body 2 only by a simple operation of closing the cover 30. Also in the card connector 1A, both of the large-size card and the small-size card are accommodated, not into the cover 30, but into the connector body 2. Thus, the card connector 1A securely holds the cards without the cards slipping from the card slot 3, 4. Furthermore, since the hooks 40 are disposed, not on the sides of the cover 30, but at the second edge portion of the cover 30, the locking strength between the cover 30 and the connector body 2 can be increased.

Additionally, in the card connector 1A, since the locking member 150 for locking the cover 30 is separated from the connector body 2, the structure of the connector body 2 can be simplified. If the locking member 150 and the cover 30 are made of a metal, a permanent deformation and a break of the locking protrusion 40A, the hook portion 151 and the like can be prevented. Further, in the card connector 1A, since the locking member 150 includes the second spring portion 155 for applying a force to the cover 30 so that the cover 30 is pivotally moved in a direction in which the card slot 4 or the card, an opening operation of the cover for exposing the card slot or the card can be facilitated.

Moreover, in the card connector 1, the longitudinal direction of terminals 10 for the large-size card is substantially perpendicular to the longitudinal direction of contact terminals 20 for the small-size card. Thus, even if the lower card slot 3 and the upper card slot 4 oppose with each other, the depressed portion for the contact terminal 10 and the depressed portion 9 for contact terminal 20 do not oppose with each other. As a result, it is possible to reduce the thickness of the connector body 2 with keeping the strength of connector body 2 sufficiently. Further, in the card connector 1, the solder portions 20b of the contact terminals 20 for the small-size card do not interfere with the solder portions 10a of the contact terminals 10 for the large-size card as shown in FIG. 11. Such a configuration facilitates a press-in working of each contact terminal, image recognition and image inspection of the soldered portion, a repair working with the use of a soldering iron and the like.

The card connector of this embodiment is not limited to the one for the above-described large-size and small-size cards. That is, the card connector of this embodiment may be adapted to only one kind of card. Further, the small-size card is not limited to SIM card and the large-size card is not limited to MMC card. Alternatively, the card connector of this embodiment may be adapted to Smart Media, SD Card, Memory Sticks and Compact Flash Card. Moreover, the card connector of this embodiment may be adapted to various electronic apparatuses other than the PDAs or the cellular phone, for example, the portable audio instrument, the camera and the like.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector for an IC card, comprising:
   a connector body;
   a card slot formed in said connector body, said card slot having a plurality of contact terminals adapted to respectively contact with a corresponding contact pad of said IC card when said IC card is positioned therein;
   a pivotal pin supported by said connector body;
   a cover pivotally supported by said pivotal pin at a first edge portion thereof and having a hook at a second edge portion opposite to said first edge portion, said cover capable of being pivotally moved about said pivotal pin to cover and expose said card slot and being moved with respect to said connector body along said pivotal pin in a closed state;
   a locking portion disposed in said connector body and capable of engaging with said hook of said cover when said cover is moved along said pivotal pin in said closed state, thereby restricting a pivotal movement of said cover for exposing said card slot or said card;
   a protrusion extending from said first edge portion of said cover; and
   a stopper portion disposed in said connector body, said stopper portion abutting against said protrusion of said cover to restrict a movement of said cover along said pivotal pin except when said cover is closed.

2. A card connector according to claim 1, further comprising a positioning portion formed in said connector body, said positioning portion providing a space in which said protrusion moves when said cover is positioned at an opening position at which said cover can be opened to expose said card slot or said card.

3. A card connector for an IC card, comprising:
   a connector body;
   a first card slot, for a small sized card, formed on one surface of said connector body, said first card slot having a plurality of contact terminals adapted to respectively contact with a corresponding contact pad of said IC card when said IC card is positioned therein;
   a pivotal pin supported by said connector body;
   a cover pivotally supported by said pivotal pin at a first edge portion thereof and having a hook at a second edge portion opposite to said first edge portion, said cover capable of being pivotally moved about said pivotal pin to cover and expose said first card slot and being moved with respect to said connector body along said pivotal pin in a closed state;
   a locking portion disposed in said connector body and capable of engaging with said hook of said cover when said cover is moved along said pivotal pin in said closed state, thereby restricting a pivotal movement of said cover for exposing said first card slot or said card; and
   a second card slot for a large-sized card formed on the other surface of said connector body.

4. A card connector according to claim 3, wherein a longitudinal direction of said small-size card positioned in said first card slot is substantially perpendicular to a longitudinal direction of said large-size card positioned in said second slot, and wherein said first edge portion of said cover is substantially in parallel with said longitudinal direction of said small-size card positioned in said first card slot.

5. A card connector for an IC card, comprising:
   a connector body;
   a card slot formed in said connector body, said card slot having a plurality of contact terminals adapted to respectively contact with a corresponding contact pad of said IC card when said IC card is positioned therein;
   a pivotal pin supported by said connector body;
   a grooved portion formed on said connector body;
   a cover pivotally supported by said pivotal pin at a first edge portion thereof and having a locking protrusion at a second edge portion opposite to said first edge portion, said cover capable of being pivotally moved about said pivotal pin to cover and expose said card slot; and
   a locking member disposed in said grooved portion of said connector body, said locking member elastically deforming in said grooved portion in response to a pressing force applied by said locking protrusion of said cover to engage with said locking protrusion when said cover is closed, wherein said locking member comprises:
   a main body;
   a hook portion projecting from said main body to engage with said locking protrusion of said cover;
   a cam surface formed on said hook portion; and
   a first spring portion allowing said main body to move in grooved portion so that said hook portion and said locking protrusion of said cover can engage with each other and applying a force to said main body so that the engagement between said hook portion and said locking protrusion is maintained.

6. A card connector according to claim 5, wherein said grooved portion including:
   a first groove for said main body, said first groove extending substantially in parallel with said second edge portion of said cover; and
   second groove for said first spring portion.

7. A card connector according to claim 5, wherein said locking member includes a second spring portion for applying a force to said cover so that said cover is pivotally moved in a direction in which said card slot or said card is exposed.

8. A card connector according to claim 5, wherein said locking member includes a knob used to move said main body in said grooved portion so that an engagement between said hook portion and said locking protrusion of said cover is released.

9. A card connector according to claim 7, wherein said hook portion, said cam surface, and said first spring portion are formed together with said main body in one piece.

10. A card connector according to claim 9, wherein said second spring portion is formed together with said main body in one piece.

11. A card connector according to claim 5, further comprising:
    a first card slot for a small-sized card formed on one surface of said connector body; and
    a second card slot for a large-sized card formed on the other surface of said connector body;
    wherein said cover is pivotally supported by said pivotal pin to be capable of covering said first card slot.

12. A card connector according to claim 11, wherein a longitudinal direction of said small-size card positioned in said first card slot is substantially perpendicular to a longitudinal direction of said large-size card positioned in said second slot, and wherein said first edge portion of said cover is substantially in parallel with said longitudinal direction of said small-size card positioned in said first card slot.

* * * * *

UNITED STATES PATENT AND TRADEMARK OFFICE
CERTIFICATE OF CORRECTION

PATENT NO. : 6,663,408 B2
DATED : December 16, 2003
INVENTOR(S) : Shigeru Sato

It is certified that error appears in the above-identified patent and that said Letters Patent is hereby corrected as shown below:

Column 14,
Line 34, before "second groove" insert -- a --.
Line 44, "claim 7," should read -- claim 5, --.

Signed and Sealed this

Twenty-seventh Day of April, 2004

JON W. DUDAS
*Acting Director of the United States Patent and Trademark Office*